(12) United States Patent
Saia et al.

(10) Patent No.: US 12,141,862 B2
(45) Date of Patent: Nov. 12, 2024

(54) SYSTEMS AND METHODS FOR ACCOUNT STATUS MONITORING

(71) Applicant: Capital One Services, LLC, McLean, VA (US)

(72) Inventors: Michael Saia, Weehawken, NJ (US); Lin Ni Lisa Cheng, New York, NY (US); Rocky Guo, Vienna, VA (US); Seth Wilton Cottle, Reston, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/945,454

(22) Filed: Sep. 15, 2022

(65) Prior Publication Data
US 2024/0095821 A1 Mar. 21, 2024

(51) Int. Cl.
*G06Q 40/00* (2023.01)
*G06Q 40/03* (2023.01)

(52) U.S. Cl.
CPC .................................. *G06Q 40/03* (2023.01)

(58) Field of Classification Search
CPC ..................................................... G06Q 40/03
See application file for complete search history.

(56) References Cited

U.S. PATENT DOCUMENTS

| 7,610,229 | B1 | 10/2009 | Kornegay et al. |
| 8,315,942 | B2 | 11/2012 | Haggerty et al. |
| 8,498,930 | B2 | 7/2013 | Chung et al. |
| 8,515,842 | B2 | 8/2013 | Papadimitriou |
| 8,799,150 | B2 | 8/2014 | Annappindi |
| 8,903,741 | B2 | 12/2014 | Imrey et al. |
| 9,830,648 | B2 | 11/2017 | Kanjlia et al. |

(Continued)

FOREIGN PATENT DOCUMENTS

WO WO-2022150343 A1 * 7/2022 ............. G06F 17/18

OTHER PUBLICATIONS

Wang et al: "A Deep Learning Approach for Credit Scoring of Peer-to-Peer Lending Using Attention Mechanism LSTM", IEEE Access, vol. 7, pp. 2161-2168, DOI: 10.1109/ACCESS.2018. 2887138. (Year: 2018).*

*Primary Examiner* — Edward J Baird
(74) *Attorney, Agent, or Firm* — TROUTMAN PEPPER HAMILTON SANDERS LLP; Christopher J. Forstner; Matthew J. Esserman

(57) ABSTRACT

Disclosed herein are systems and methods for account status monitoring. The method can include receiving user registration information and account information corresponding to a first user account. The account information can include first user credit information. The method can include analyzing, by a machine learning rules engine, the account information and the user registration information to create a user behavior pattern associated with the first user account. The method can further include determining an anomaly in the user behavior pattern indicative of a life event. Based on the life event and the user registration information, the method can determine a second user account and corresponding account information comprising second user credit information. In response, the method can include predicting, by a convolutional neural network, an effect on the second user credit information resulting from the transfer of the first user credit information to the second user account.

20 Claims, 5 Drawing Sheets

(56) References Cited

U.S. PATENT DOCUMENTS

| | | | |
|---|---|---|---|
| 10,565,643 | B2 | 2/2020 | Rohn et al. |
| 11,132,742 | B1 | 9/2021 | Wasser et al. |
| 2012/0191596 | A1* | 7/2012 | Kremen ................. G06Q 40/02 |
| | | | 705/38 |
| 2012/0278227 | A1 | 11/2012 | Kolo et al. |
| 2013/0117173 | A1 | 5/2013 | Schwarz et al. |
| 2019/0244253 | A1* | 8/2019 | Vij ........................ G06F 18/214 |
| 2021/0073904 | A1 | 3/2021 | Kanjlia et al. |
| 2021/0287082 | A1* | 9/2021 | Wu ......................... G06N 20/00 |
| 2022/0215141 | A1* | 7/2022 | Gutierrez ................ G06F 17/18 |
| 2023/0351194 | A1* | 11/2023 | Wright .................. G06F 16/285 |
| 2023/0351424 | A1* | 11/2023 | Mistor ............... G06Q 30/0201 |

\* cited by examiner

SYSTEMS AND METHODS FOR ACCOUNT STATUS MONITORING

FIELD OF THE DISCLOSURE

Examples of the present disclosure relate generally to systems and methods for account status monitoring. Particularly, examples of the present disclosure relate to systems and methods for predicting effects of life events on credit information.

BACKGROUND

A credit score is a value that represents the creditworthiness of a person, business, organization or other entity. A credit score is calculated based on credit report information typically sourced from credit bureaus. Over the life of an individual there may be different events that can be relevant (directly or indirectly) to the creditworthiness of a person, business, organization or other entity. Creditors or lenders use credit scores to evaluate the potential risk posed by lending money to a borrower. Lenders use credit scores to determine whether a borrower qualifies for a loan, at what interest rate, and what credit limits. Credit scoring is often conducted prior to authorizing access or granting credit. Credit scoring is not limited to lenders. Other organizations, such as mobile phone companies, retailers, insurance companies, landlords, accommodations operators, and government departments can also consider credit scores prior to conducting transactions. Because credit scoring is so ubiquitous, and often a gatekeeper of many critical life purchases, users may wish to keep a close eye on their credit scores. Key life events can have a profound effect on credit scores, during which there is very little transparency regarding exactly how much user's credit score will be altered by any given life event.

What is needed, therefore, are systems and methods that can monitor user behavior, identify key life events, and predict an effect on a user's credit score based on the user behavior and the key life events. Examples of the present disclosure address this need as well as other needs that will become apparent upon reading the description below in conjunction with the drawings.

BRIEF SUMMARY

Examples of the present disclosure relate generally to systems and methods for account status monitoring. Particularly, examples of the present disclosure relate to systems and methods for predicting effects of life events on credit information.

Examples of the present disclosure can include a method for account status monitoring. The method can include receiving, from a user device, user registration information and account information corresponding to a first user account. The account information can include first user credit information, such as a credit score. The method can further include analyzing, by a machine learning rules engine, the account information and the user registration information to create a user behavior pattern associated with the first user account.

In some examples, the method can include determining an anomaly in the user behavior pattern indicative of a life event. For instance, the life event can be a death, a change in marital status, a change in residency, or a child reaching the age of majority. The anomaly can be, for example, a payroll deduction, a bank transaction, a car purchase, a mortgage payment, or a rental payment. The method can further include determining, based on the life event and the user registration information, a second user account and corresponding account information comprising second user credit information. In some examples, the user registration information can include the account information associated with the second user account and an indication that the second user account is designated as the recipient of the first user credit information.

In response, the method can include predicting, by a convolutional neural network, an effect on the second user account and the second user credit information resulting from the transfer of the first user credit information to the second user account. In some examples, the method can further include transferring the first user credit information to the second user account and aggregating the first user credit information and the second user credit information to create aggregated user credit information.

In some examples, the method can further include calculating an aggregated user credit score based on the aggregated user credit information. The method can also include predicting, by the convolutional neural network, one or more corrective actions to improve the aggregated user credit score. In response, the method can include transmitting, for display on the user device, the one or more corrective actions.

The method can also include predicting, by the deconvoluted neural network, one or more corrective actions to improve the first user credit information and transmitting, for display on the user device, the one or more corrective actions to improve the first user credit information. The method can further include transmitting, for display on the user device, the effect on the second user account and the second user credit information resulting from the transfer of the first user credit information to the second user account.

In some examples, the method can include linking the first user account to an external provider by an external provider application programming interface (API) and obtaining the user registration information and the account information corresponding to the first user account from the external provider API. In response to receiving a confirmation from the user, the method can further include transferring the first user credit information to the second user account.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present disclosure in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the disclosure discussed herein. In similar fashion, while exemplary examples can be discussed below as device, system, or method examples, it is to be understood that such exemplary examples can be implemented in various devices, systems, and methods of the present disclosure.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
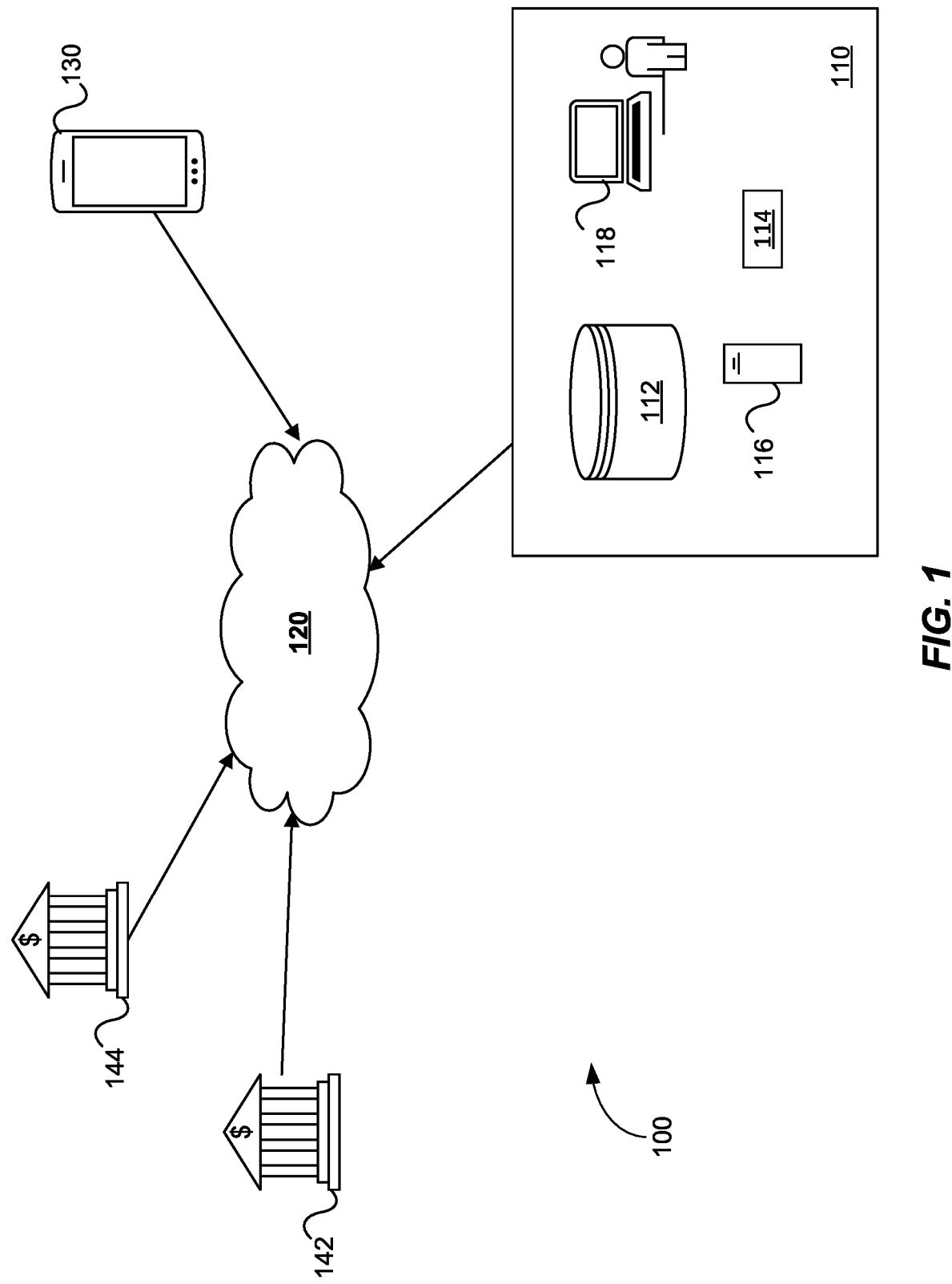
FIG. 1 illustrates a component diagram of an example system for account status monitoring according to some examples of the present disclosure.

Credit scores generated by conventional techniques may be incomplete and unclear. Traditionally only a small number of credit bureaus generate credit scores using data from limited data sources. It can be difficult to confirm the veracity and integrity of the data sources. The consumer may not understand how their credit score is generated. The consumer might not be notified when data is submitted that impacts their credit score. Despite its criticality in determining the creditworthiness of a consumer, the calculation of credit scores is a virtual black box for even sophisticated consumers due to the countless variables that are included in conventional credit score algorithms, the constant updating of these variables, and even changes to the algorithms themselves. These constraints leave consumers confused as to the answers to questions like, when is it the right time to close a credit card that is no longer needed, or should a certain behavior be changed in order to get a credit score increase?

Such constraints create various technical problems. Electronic loan documents may be withheld or erroneous if such information is not available. Fraudsters committing identity theft may not be discovered in a timely manner Loan pre-approvals may be unavailable. Bank systems, point of sale systems, and others will be slowed down during transactions, costing bandwidth, processing power, time, and money.

As described above, a problem with current credit score account monitoring is a lack of transparency. Credit scores generated by conventional techniques may be incomplete and unclear. Traditionally only a small number of credit bureaus generate credit scores using data from limited data sources. It can be difficult to confirm the veracity and integrity of the data sources. The consumer may not understand how their credit score is generated. The consumer might not be notified when data is submitted that impacts their credit score.

Disclosed embodiments may employ credit information. Credit information may be used to evaluate a user's credit history. For example, credit information may include a credit score, a list of debts, a list of liens, loan repayments, income, credit card debts, credit card repayments, debits, and the like. In some embodiments, credit information may be associated with a particular individual. For example, a user can have an associated credit score, an associated list of debt repayments, an associated list of assets, and the like. Embodiments may employ varying types of credit information consistent with this disclosure.

Examples of the present disclosure can include a method for account status monitoring. The method can include receiving, from a user device, user registration information and account information corresponding to a first user account. The account information can include first user credit information, such as a credit score. The method can further include analyzing, by a machine learning rules engine, the account information and the user registration information to create a user behavior pattern associated with the first user account.

In some examples, the method can include determining an anomaly in the user behavior pattern indicative of a life event. For instance, the life event can be a death, a change in marital status, a change in residency, or a child reaching the age of majority. The anomaly can be, for example, a payroll deduction, a bank transaction, a car purchase, a mortgage payment, or a rental payment. The method can further include determining, based on the life event and the user registration information, a second user account and corresponding account information comprising second user credit information. In some examples, the user registration information can include the account information associated with the second user account and an indication that the second user account is designated as the recipient of the first user credit information.

In response, the method can include predicting, by a convolutional neural network, an effect on the second user account and the second user credit information resulting from the transfer of the first user credit information to the second user account. In some examples, the method can further include transferring the first user credit information to the second user account and aggregating the first user credit information and the second user credit information to create aggregated user credit information.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to exemplary examples of the disclosed technology, examples of which are illustrated in the accompanying drawings and disclosed herein. Wherever convenient, the same references numbers will be used throughout the drawings to refer to the same, or like, parts.

FIG. 1 illustrates a system 100 for account status monitoring. As shown, the system 100 can comprise an organization 110. The organization 110 can include one or more computing devices 118 associated with users within the organization 110. The organization 110 can also include one or more databases 112, one or more processors 116, and one or more memories 114. The databases 112, processors 116, and memories 114 can be contained within any of the computing devices 118. Alternatively, the databases 112, processors 116, and memories 114 can be contained within a single computing device. Alternatively, or in addition, the databases 112, processors 116, and memories 114 can be standalone and/or contained in separate computing devices.

In some examples, the organization 110 can be associated with, for example, a business, corporation, individual, partnership, or any entity that can provide financial services or processes financial transactions such as a bank, a credit card company, retailer, or the like. In some examples, the organization 110 can provide goods and services. Although the organization 110 and the one or more computing devices 118 are shown as being separate in FIG. 1, in some examples, some or all of the elements of the organization 110 and the one or more computing devices 118 can be combined together and used in conjunction with each other.

The computing devices 118 operating in the organization can include one or more of a mobile device, smart phone, general purpose computer, tablet computer, laptop computer, telephone, a public switched telephone network (PSTN) landline, smart wearable device, voice command device, other mobile computing device, or any other device capable of communicating with a network and/or with one or more components of the system 100.

The computing devices 118 and/or the organization 110 can include or otherwise interact with a variety of computer-readable media to facilitate control of the computing device to implement one or more aspects of the disclosed subject matter. The computer-readable media can be any available media that is accessible to the computing devices 118 and/or the organization 110 and includes volatile and nonvolatile media, and removable and non-removable media. Computer-readable media can comprise two distinct and mutually exclusive types, namely storage media and communication media.

Storage media includes volatile and nonvolatile, removable, and nonremovable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid state devices (e.g., solid state drive (SSD), flash memory drive (e.g., card, stick, key drive)), or any other like mediums that store, as opposed to transmit or communicate, the desired information accessible by the computing devices 118 and/or the storage devices 112. Accordingly, storage media excludes modulated data signals as well as that described with respect to communication media.

The organization 110 can also include communication connection(s) to enable communication with at least a user device 130 by means of a network 120. The communication connection(s) can include wired or wireless communication mechanisms to support network communication. The network 120 can correspond to a local area network (LAN) or a wide area network (WAN) such as the Internet. An example of the user device 130 can be another processor-based device with which the organization 110 can interact. The user device 130 is described in greater detail in FIG. 3.

The network 120 may be of any suitable type, including individual connections via the internet such as cellular or WiFi networks. In some embodiments, the network 206 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The processors 116 may be one or more known processing devices, such as a microprocessor from the Pentium™ family manufactured by Intel™ or the Turion™ family manufactured by AMD™. The processors 116 may constitute a single core or multiple core processor that executes parallel processes simultaneously. For example, the processors 116 may be a single core processor that is configured with virtual processing technologies. In certain embodiments, the processors 116 may use logical processors to simultaneously execute and control multiple processes. The processors 116 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The memories 114 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In some examples, the processing techniques described herein can be implemented as a combination of executable instructions and data within the memories 114.

The system 100 can also include a first user account 142 and a second user account 144. The first user account 142 and the second user account 144 can be associated with a financial institution. In some examples, the financial institution can be associated with or related to the organization 110. For instance, the first user account 142 and the second user account 144 can be associated with, for example, a business, corporation, individual, partnership, or any entity that can provide financial services or processes financial transactions such as a bank, a credit card company, retailer, or the like.

Although the first user account 142 and the second user account 144 are shown as being separate in FIG. 1, in some examples, some or all of the elements of the first user account 142 and the second user account 144 can be combined together under one overarching organization, such as the organization 110, or any other business, corporation, individual, partnership, or any entity that can provide financial services or processes financial transactions such as a bank, a credit card company, retailer, or the like.

The organization 110 can also include one or more machine learning algorithms. The algorithms can include machine learning techniques, such as a machine learning rules engine. The algorithms can also employ machine learning models. In some examples, the organization 110 can also include a neural network, such as a convolutional neural network. The organization 110 can also include a convolutional neural network and rule-based algorithm hybrid.

Figure 2:
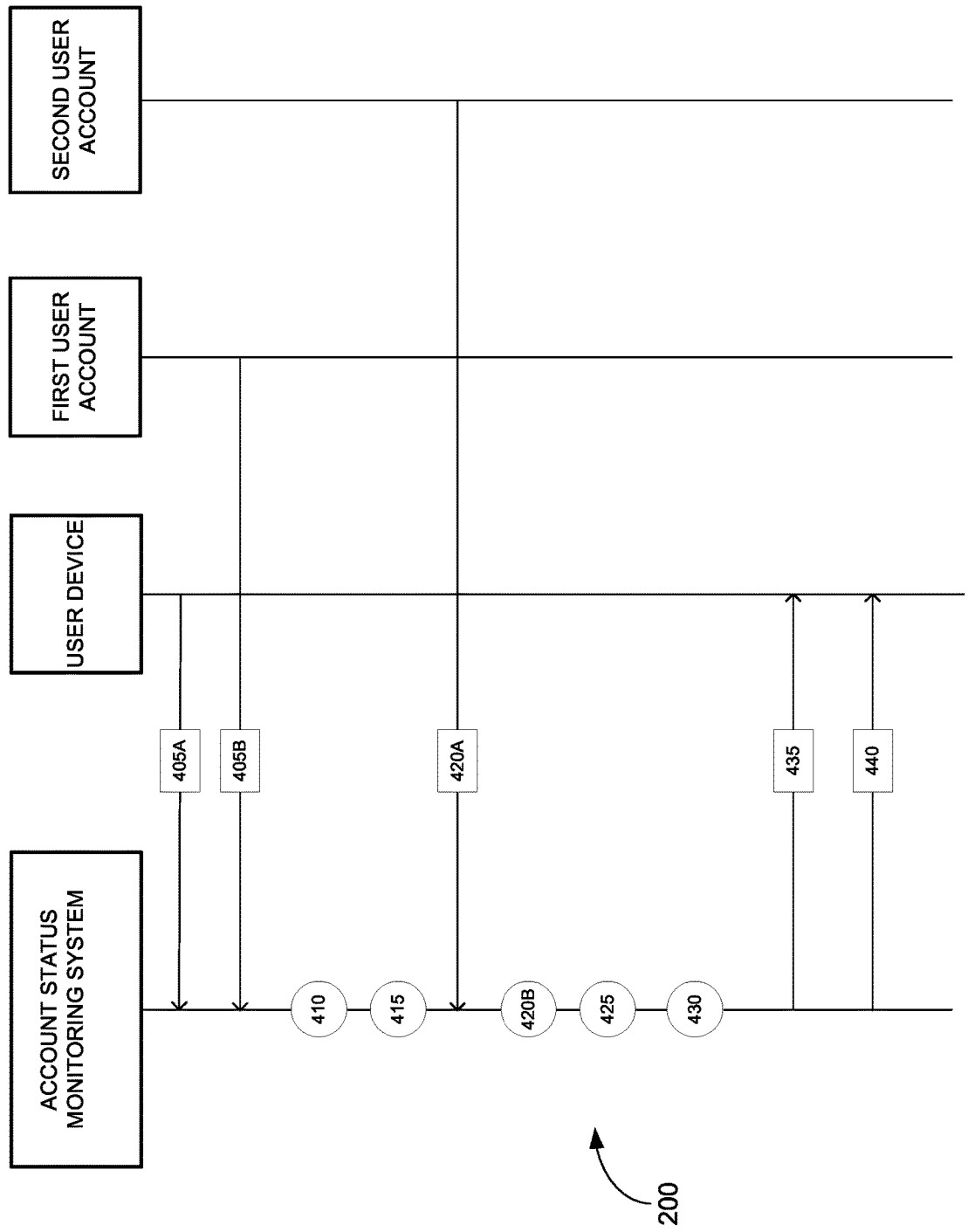
FIG. 2 illustrates a timing diagram of an example system for account status monitoring according to some examples of the present disclosure.

FIG. 2 illustrates an example timing diagram 200 of the system 100. As shown, the organization 110 can receive 405A user registration information from the user device 130. The organization 110 can also receive 405B account information corresponding to the first user account 142 from the first user account 142. The organization 110 can then analyze 410 the account information and the user registration information to create a user behavior pattern associated with the first user account 142. The analysis 410 can be performed by a machine learning rules engine, or other machine learning techniques within the organization 110.

The organization 110 can then determine 415 an anomaly in the user behavior pattern indicative of a life event. For instance, the life event can be a death, a change in marital status, a change in residency, or a child reaching the age of majority. The anomaly can be, for example, a payroll deduction, a bank transaction, a car purchase, a mortgage payment, or a rental payment. The determination 415 can be performed by a machine learning technique within the organization, such as a machine learning rules engine (separate from the machine learning rules engine for the analysis 410) or a neural network.

Based on the life event and the user registration information, the organization 110 can retrieve 420A account information corresponding to the second user account 144 from the second user account 144. The organization 110 can further determine 420B that the second user account 144 is designated as the recipient of the first user credit information. The determination 420B can be determined from the user registration comprising an indication that the second user account 144 is the designated recipient of the first user credit information.

The organization 110 can then predict 425 an effect on the second user account 144 and the second user credit information resulting from the transfer of the first user credit information from the first user account 142 to the second user account 144. The organization 110 can also predict 430 one or more corrective actions to improve the credit information of the first user account 142 and/or the second user account. The predictions can be implemented by a machine learning technique within the organization 110, such as by a convolutional neural network. The predictions can also be implemented by a convolutional neural network and rule-based algorithm hybrid.

The organization 110 can then transmit 435 the effect resulting from the transfer and transmit 440 the one or more corrective actions to the user device 130. The user device 130 can display the effect on the second user account 144 and the second user credit information resulting from the transfer of the first user credit information to the second user account 144. The corrective actions and the effect can be displayed on a user interface (UI) on the user device 130.

Figure 3:
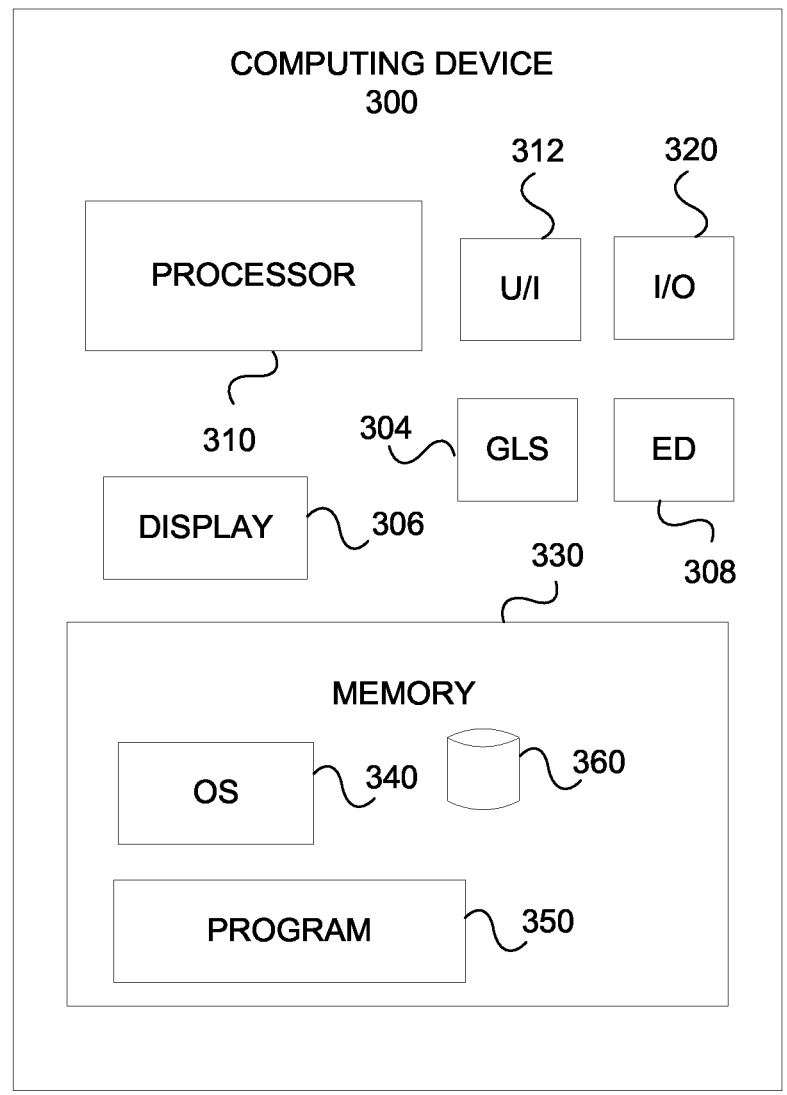
FIG. 3 illustrates a component diagram of an example of a computing device used in a system for account status monitoring according to some examples of the present disclosure.

An example embodiment of a user device 130 is shown in more detail in FIG. 3. While FIG. 3 is illustrated and described with respect to the user device 130, it is to be understood that the example is merely illustrative, and that the illustrations within FIG. 3 can comprise one or more additional components of the user device 130 that would be understood by one of ordinary skill in the art.

As shown, the user device 130 can include a processor 310; an I/O device 320; a memory 330 containing an OS 340 (such as a host operating system); a storage device 360, which can be any suitable repository of data; and a program 350. In some examples, the user device 130 can include components such as an accelerometer; a gyroscope; a GLS 304 for determining the geographic location of the computing device 120; a display 306 for displaying content such as text messages, images, and selectable buttons/icons/links; an environmental data ("ED") sensor 308 for obtaining environmental data including audio and/or visual information; a U/I device 312 for receiving user input data, such as data representative of a click, a scroll, a tap, a press, or typing on an input device that can detect tactile inputs; a display; a microphone and/or an image capture device, such as a digital camera. In some examples, the user device 130 can include a transceiver to communicate with the network 120 and/or other components of the system 100. In some examples, the user device 130 can further include a peripheral interface, a mobile network interface in communication with the processor 310, a bus configured to facilitate communication between the various components of the user device 130, and/or a power source configured to power one or more components of the user device 130.

Additionally, the user device 130 can include an API. The API can be configured to provide any and/or all of the functionalities of the user device 130 as described herein. The API can communicate with various components of the user device 130 and the network 120. Further, the API of the user device 130 can communicate (e.g., call to) the API of an organization associated with the first user account 142 and/or the second user account 144.

The various components of the user device 130 can include the same or similar attributes or capabilities of the same or similar components discussed with respect to the computing devices 118. The computing devices 118 can have some or all of the same components described with respect to the user device 130.

While the following methods are described with reference to the organization 110, it is understood that one or more method steps or whole methods can be performed by other systems, general-purpose computers, computer operators, and the like.

Figure 4:
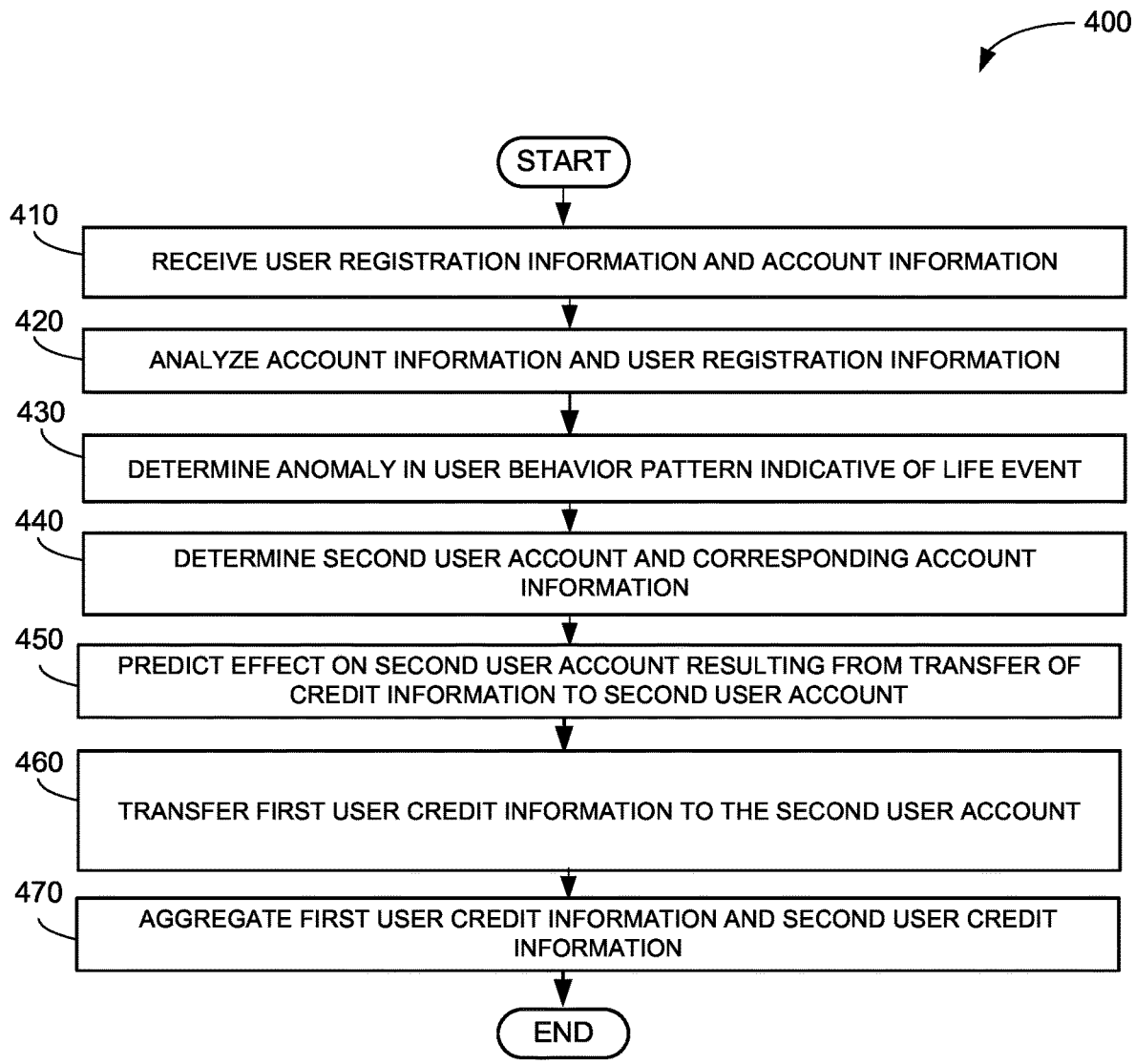
FIG. 4 illustrates a flowchart of an example method for account status monitoring according to some examples of the present disclosure.

FIG. 4 illustrates a method 400 for account status monitoring. In block 410, the method 400 can receive user registration information and account information. The account information can be from a first user account, such as the first user account 142. The account information can include first user credit information, such as a credit score. The user registration information can include, for instance, a name, an address, an email address, log-in credentials, account numbers, social security numbers, credit lines, and the like. The user registration information can also include opt-in information indicative of a user's participation in the system 100. The user registration information can also include an indication that a second user account, such as the second user account 144, is designated as the recipient of the first user credit information. The account information can include, for instance, account numbers, payment information, routing numbers, financial institution registration, transaction lists, transaction history, spend history, open credit lines, and the like. The method 400 can then proceed on to block 420.

In block 420, the method 400 can analyze the account information and the user registration information. The method 400 can employ a machine learning rules engine to create a user behavior pattern associated with the first user account 142. The user behavior pattern can establish baseline account data for the user, such as recurring transactions or a spend limit. The method 400 can then proceed on to block 430.

In block 430, the method 400 can then determine an anomaly in the user behavior pattern indicative of a life event. For instance, the life event can be a death, a change in marital status, a change in residency, or a child reaching the age of majority. The anomaly can be, for example, a payroll deduction, a bank transaction, a car purchase, a mortgage payment, or a rental payment. The determination can be made by a machine learning technique, such as a machine learning rules engine, a machine learning algorithm, a neural network, a convolutional neural network, and/or a convolutional neural network and rule-based algorithm hybrid. The method 400 can then proceed on to block 440.

In block 440, the method 400 can determine a second user account, such as the second user account 144, and corresponding account information comprising second user credit information. The determination can be made based on the indication in the user registration information that the second user account 144 is designated as the recipient of the first user credit information. The method 400 can proceed on to block 450.

In block 450, the method 400 can predict an effect on the second user account 144 and the second user credit information resulting from the transfer of the first user credit information to the second user account 144. The prediction can be made by a machine learning technique, such as a machine learning rules engine, a machine learning algorithm, a neural network, a convolutional neural network, and/or a convolutional neural network and rule-based algorithm hybrid. For example, the prediction can determine an effect on the second user account credit score if the first user account spend history and credit lines are transferred to the second user account. The method 400 can then proceed on to block 460.

In block 460, the method 400 can transfer the first user credit information to the second user account 144. The method 400 can include linking the first user account to an external provider by an external provider application programming interface (API) and obtaining the user registration information and the account information corresponding to the first user account from the external provider API. The method 400 can transfer the first user credit information from the API associated with the first user account 142 to the API associated with the second user account 144. The transfer can be commenced in response to a confirmation from a user, such as a confirmation from a user device 130. The confirmation can be input by a user on the user device 130, such as on the UI. The method 400 can then proceed on to block 470.

In block 470, the method 400 can aggregate the first user credit information and the second user credit information to create aggregated user credit information. The method 400 can also calculate an aggregated user credit score based on the aggregated user credit information. The method 400 can then terminate after block 470. However, in some examples, the method 400 can proceed on to other method steps not shown.

Figure 5:
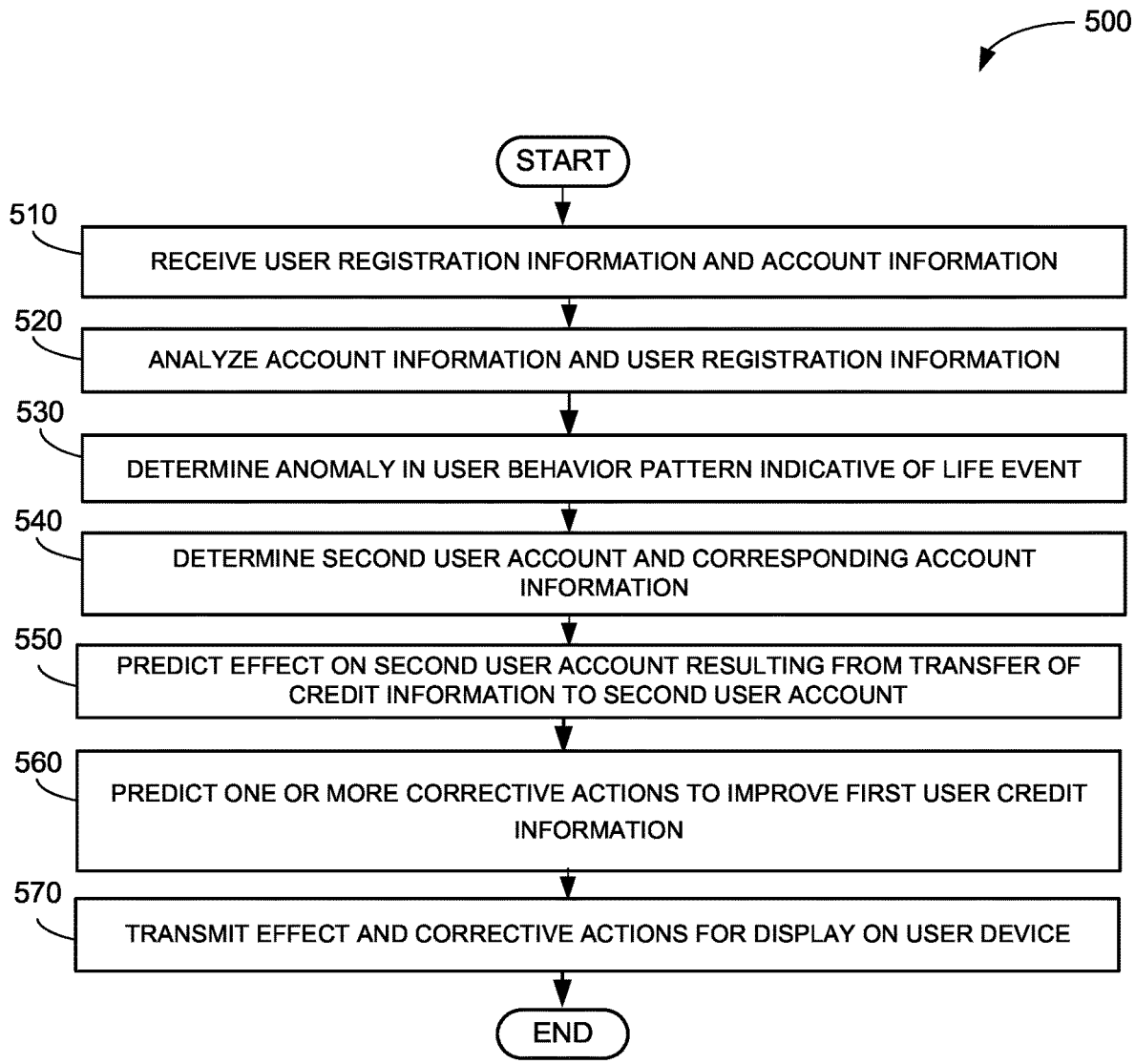
FIG. 5 illustrates a flowchart of another example method for account status monitoring according to some examples of the present disclosure.

FIG. 5 illustrates a method 500 for account status monitoring. In block 510, the method 500 can receive user registration information and account information. The account information can be from a first user account, such as the first user account 142. The account information can include first user credit information, such as a credit score. The user registration information can include, for instance, a name, an address, an email address, log-in credentials, account numbers, social security numbers, credit lines, and the like. The user registration information can also include opt-in information indicative of a user's participation in the system 100. The user registration information can also include an indication that a second user account, such as the second user account 144, is designated as the recipient of the first user credit information. The account information can include, for instance, account numbers, payment information, routing numbers, financial institution registration, transaction lists, transaction history, spend history, open credit lines, and the like. The method 500 can then proceed on to block 520.

In block 520, the method 500 can analyze the account information and the user registration information. The method 500 can employ a machine learning rules engine to create a user behavior pattern associated with the first user account 142. The user behavior pattern can establish baseline account data for the user, such as recurring transactions or a spend limit. The method 500 can then proceed on to block 530.

In block 530, the method 500 can then determine an anomaly in the user behavior pattern indicative of a life event. For instance, the life event can be a death, a change in marital status, a change in residency, or a child reaching the age of majority. The anomaly can be, for example, a payroll deduction, a bank transaction, a car purchase, a mortgage payment, or a rental payment. The determination can be made by a machine learning technique, such as a machine learning rules engine, a machine learning algorithm, a neural network, a convolutional neural network, and/or a convolutional neural network and rule-based algorithm hybrid. The method 500 can then proceed on to block 540.

In block 540, the method 500 can determine a second user account, such as the second user account 144, and corresponding account information comprising second user credit information. The determination can be made based on the indication in the user registration information that the second user account 144 is designated as the recipient of the first user credit information. The method 500 can proceed on to block 550.

In block 550, the method 500 can predict an effect on the second user account 144 and the second user credit information resulting from the transfer of the first user credit information to the second user account 144. The prediction can be made by a machine learning technique, such as a machine learning rules engine, a machine learning algorithm, a neural network, a convolutional neural network, and/or a convolutional neural network and rule-based algorithm hybrid. For example, the prediction can determine an effect on the second user account credit score if the first user account spend history and credit lines are transferred to the second user account. The method 500 can then proceed on to block 560.

In block 560, the method 500 can predict one or more corrective actions to improve the first user credit information. For example, the convolutional neural network or the machine learning techniques in the organization 110 can predict corrective actions to improve the first user account credit score. The method 500 can then proceed on to block 570.

In block 570, the method 500 can transmit the effect and the corrective actions for display on a user device. For example, the organization 110 can transmit the effect resulting from the transfer and transmit the one or more corrective actions to the user device 130. The user device 130 can display the effect on the second user account 144 and the second user credit information resulting from the transfer of the first user credit information to the second user account 144. The corrective actions and the effect can be displayed on a user interface (UI) on the user device 130. The method 500 can terminate after block 570. However, in some examples, the method 500 can continue on to other method steps not shown.

As used in this application, the terms "module," "server," "processor," "memory," and the like are intended to include one or more computer-related units, such as but not limited to hardware, firmware, a combination of hardware and software, software, or software in execution. For example, a module may be, but is not limited to being, a process running on a processor, an object, an executable, a thread of execution, a program, and/or a computer. By way of illustration, both an application running on a computing device and the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one component interacting with another module in a local system, distributed system, and/or across a network such as the Internet with other systems by way of the signal.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology. That is, the disclosed technology includes the performance of some, or all steps of the methods and processes described herein in conjunction with the performance of additional steps not expressly discussed herein. Further, the present disclosure contemplates methods and processes in which some, but not all, steps described herein are performed.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

Exemplary Use Cases

The following exemplary use cases describe examples of a typical user flow pattern. They are intended solely for explanatory purposes and not limitation.

A user can register their user account with an organization (e.g., a financial institution) to associate their account number and account information with the organization. The account information can include a credit score for the user, and a second account which is designated as the transfer account. The organization can access the account to obtain spend and transaction history for the user. A machine learning rules engine can construct a user behavior pattern to determine monthly expenditures and bills. The rules engine can also determine an anomaly in the user behavior pattern. A large college tuition payment can indicate that the user has a child who reached the age of majority. The child can be associated with the transfer account. The organization can then obtain information about the transfer account and the child, such as a credit score of the child. Using a convolutional neural network, the organization can predict an effect on the child's credit score that would result from transferring the user's account (and associated history) to the child's account. The effect can be that the child's credit score increases by 50 points. The organization can send the effect to the user (e.g., on a user device) and ask the user for confirmation on a display to make the transfer of accounts. Once the user confirms, the user's account and account history can be transferred to the transfer account and the child. The child's credit information, account information, and registration information can be updated, and the child's credit score can be aggregated with the user account's credit information to create a new, aggregated credit score for the child.

What is claimed is:

1. A method for account status monitoring, the method comprising:
   receiving, from a user device, user registration information and account information corresponding to a first user account, the account information comprising first user credit information;

linking the first user account to an external provider by an external provider application programming interface (API);
obtaining the user registration information and the account information corresponding to the first user account from the external provider API;
creating, by a machine learning rules engine, a first user behavior pattern associated with the first user account based on the account information and the user registration information;
determining an anomaly in the first user behavior pattern indicative of a life event;
determining, based on the life event and the user registration information, an account of a second user and corresponding account information comprising credit information of a second user;
predicting, by a convolutional neural network, an effect on the account of the second user and the credit information of the second user resulting from a transfer of the first user credit information to the account of the second user;
responsive to receiving a confirmation from the first user, transferring the first user credit information to the account of the second user; and
creating aggregated user credit information by aggregating the first user credit information and the credit information of the second user.

2. The method of claim 1, wherein the user registration information includes the account information associated with the account of the second user and an indication that the account of the second user is designated as the recipient of the first user credit information.

3. The method of claim 1, wherein the first user credit information and the credit information of the second user comprise a first credit score and a second credit score, respectively.

4. The method of claim 1, further comprising:
calculating an aggregated user credit score based on the aggregated user credit information;
predicting, by the convolutional neural network, one or more corrective actions to improve the aggregated user credit score; and
transmitting, for display on the user device, the one or more corrective actions.

5. The method of claim 1, wherein the life event comprises one or more of: a death, a change in marital status, a change in residency, or a child reaching the age of majority.

6. The method of claim 1, further comprising:
predicting, by the convolutional neural network, one or more corrective actions to improve the first user credit information;
transmitting, for display on the user device, the effect on the account of the second user and the credit information of the second user resulting from the transfer of the first user credit information to the account of the second user; and
transmitting, for display on the user device, the one or more corrective actions to improve the first user credit information.

7. The method of claim 1, wherein the anomaly comprises one or more of: a payroll deduction, a bank transaction, a car purchase, a mortgage payment, or a rental payment.

8. The method of claim 1, further comprising calculating an aggregated user credit score based on the aggregated user credit information.

9. The method of claim 1, wherein the second user is a child of the first user.

10. The method of claim 1, wherein the first user credit information comprises at least one of a spend history of the first user account or a credit line of the first user account.

11. A system for account status monitoring, comprising:
a processor; and
a memory storing instructions that, when executed by the processor, cause the system to:
receive, from a user device, user registration information and account information corresponding to a first user account, the account information comprising first user credit information;
link the first user account to an external provider by an external provider application programming interface (API);
obtain the user registration information and the account information corresponding to the first user account from the external provider API;
create, by a first machine learning algorithm, a first user behavior pattern associated with the first user account based on the account information and the user registration information;
determine an anomaly in the first user behavior pattern indicative of a life event;
determine, based on the life event and the user registration information, an account of a second user and corresponding account information comprising credit information of a second user;
predict, by a second machine learning algorithm, an effect on the account of the second user and the credit information of the second user resulting from a transfer of the first user credit information to the account of the second user;
responsive to receiving a confirmation from the first user, transfer the first user credit information to the account of the second user; and
aggregate the first user credit information and the credit information of the second user.

12. The system of claim 11, wherein the user registration information includes the account information associated with the account of the second user and an indication that the account of the second user is designated as the recipient of the first user credit information.

13. The system of claim 11, wherein the first user credit information and the credit information of the second user comprise a first credit score and a second credit score, respectively.

14. The system of claim 11, wherein the first user behavior pattern comprises a spending pattern associated with the first user account.

15. The system of claim 11, wherein the life event comprises one or more of: a death, a change in marital status, a change in residency, or a child reaching the age of majority.

16. The system of claim 11, wherein the instruction further cause the system to:
predict, by the second machine learning algorithm, one or more corrective actions to improve the first user credit information;
transmit, for display on the user device, the effect on the account of the second user and the credit information of the second user resulting from the transfer of the first user credit information to the account of the second user; and
transmit, for display on the user device, the one or more corrective actions to improve the first user credit information.

17. The system of claim 11, wherein the anomaly comprises one or more of: a payroll deduction, a bank transaction, a car purchase, a mortgage payment, or a rental payment.

18. A method for account status monitoring, the method comprising:

receiving, from a user device, user registration information and account information corresponding to a first user account, the account information comprising first user credit information;

linking the first user account to an external provider by an external provider application programming interface (API);

obtaining the user registration information and the account information corresponding to the first user account from the external provider API;

creating, by a first machine learning algorithm, a first user behavior pattern associated with the first user account based on the account information and the user registration information;

determining an anomaly in the first user behavior pattern indicative of a life event;

determining, based on the life event and the user registration information, an account of a second user and corresponding account information comprising credit information of a second user;

predicting, by a second machine learning algorithm, an effect on the account of the second user and the credit information of the second user resulting from a transfer of the first user credit information to the account of the second user;

predicting, by the second machine learning algorithm, one or more corrective actions to improve the first user credit information;

responsive to receiving a confirmation from the first user, transferring the first user credit information to the account of the second user;

transmitting, for display on the user device, the effect on the account of the second user and the credit information of the second user resulting from the transfer of the first user credit information to the account of the second user; and transmitting, for display on the user device, the one or more corrective actions to improve the first user credit information.

19. The method of claim 18, wherein the user registration information includes the account information associated with the account of the second user and an indication that the account of the second user is designated as the recipient of the first user credit information.

20. The method of claim 18, wherein the first user credit information and the credit information of the second user comprise a first credit score and a second credit score, respectively.

\* \* \* \* \*